United States Patent
Mureinik et al.

(10) Patent No.: US 12,008,373 B1
(45) Date of Patent: Jun. 11, 2024

(54) INSTANCE INSTRUMENTATION FOR DIFFERENT DATA SOURCES

(71) Applicant: Synopsys, Inc., Mountain View, CA (US)

(72) Inventors: Allon Mureinik, Tel-Aviv (IL); Niv Mamam, Herzliya (IL)

(73) Assignee: Synopsys, Inc., Sunnyvale, CA (US)

( * ) Notice: Subject to any disclaimer, the term of this patent is extended or adjusted under 35 U.S.C. 154(b) by 225 days.

(21) Appl. No.: 17/450,564

(22) Filed: Oct. 12, 2021

Related U.S. Application Data

(60) Provisional application No. 63/090,646, filed on Oct. 12, 2020.

(51) Int. Cl.
| | |
|---|---|
| G06F 21/00 | (2013.01) |
| G06F 9/30 | (2018.01) |
| G06F 9/445 | (2018.01) |
| G06F 21/51 | (2013.01) |
| G06F 21/54 | (2013.01) |

(52) U.S. Cl.
CPC ........ *G06F 9/3017* (2013.01); *G06F 9/44521* (2013.01); *G06F 21/51* (2013.01); *G06F 21/54* (2013.01)

(58) Field of Classification Search
None
See application file for complete search history.

(56) References Cited

U.S. PATENT DOCUMENTS

| | | | | |
|---|---|---|---|---|
| 5,892,900 | A * | 4/1999 | Ginter | H04L 63/20 726/26 |
| 8,621,607 | B2 * | 12/2013 | Pike | G06F 21/52 718/1 |
| 11,431,592 | B2 * | 8/2022 | Deen | G06N 20/00 |
| 2011/0145920 | A1 * | 6/2011 | Mahaffey | H04W 12/12 726/22 |
| 2019/0303579 | A1 * | 10/2019 | Reddy | H04L 9/3239 |

(Continued)

OTHER PUBLICATIONS

Jenkins, John; Cai, Haipeng. Leveraging Historical Versions of Android Apps for Efficient and Precise Taint Analysis. 2018 IEEE/ACM 15th International Conference on Mining Software Repositories (MSR). https://ieeexplore.ieee.org/stamp/stamp.jsp?tp=&arnumber=8595209. (Year: 2018).*

(Continued)

*Primary Examiner* — Jeremiah L Avery
(74) *Attorney, Agent, or Firm* — Patterson + Sheridan, LLP

(57) ABSTRACT

Instance instrumentation is provided for different data sources by identifying an instance of a function in a program that receives input from an untrusted source; and replacing, at runtime of the program, the instance of the function with an instrumented version of the function that includes a marking function to indicate an output of the instrumented version of the function is tainted by the input received from the untrusted source. Additionally, instance instrumentation can be provided by identifying a second instance of the function in the program that does not receive input from the untrusted source; and leaving, at runtime of the program, the second instance of the function alone, wherein the second instance of the function is not replaced with the instrumented version of the function.

20 Claims, 5 Drawing Sheets

(56) References Cited

U.S. PATENT DOCUMENTS

2020/0186350 A1* 6/2020 Wentz .................. H04L 9/3247

OTHER PUBLICATIONS

Kim, Junhyoung et al. Survey of dynamic taint analysis. 2014 4th IEEE International Conference on Network Infrastructure and Digital Content. https://ieeexplore.ieee.org/stamp/stamp.jsp?tp=&arnumber=7000307 (Year: 2014).*

Zhang, Ruoyu et al. Efficient Taint Analysis with Taint Behavior Summary. 2011 Third International Conference on Communications and Mobile Computing. https://ieeexplore.ieee.org/stamp/stamp.jsp?tp=&arnumber=5931132 (Year: 2011).*

* cited by examiner

```
const taintedValues = [];

function isTainted(obj) {
    return
taintedValues.includes(obj);
}
```
125

```
function
markTainted(obj) { taintedValues.push(obj)
;
}
```
185

```
function toUpperCase() {
    const result =      });
```
110

```
Object.setPrototypeOf(obj, {
        toUpperCase: function toUpperCase() {
            const result =
String.prototype.toUpperCase.apply(this);
            markTainted(result);
            return result;
        }
    });
```
180

```
String.prototype.origToUpperCase =
String.prototype.toUpperCase;
String.prototype.toUpperCase =
function toUpperCase() {
    const result =
this.origToUpperCase();
    if (isTainted(this)) {
        markTainted(result);
    }
    return result;
}
```
120

FIG. 2

INSTANCE INSTRUMENTATION FOR DIFFERENT DATA SOURCES

CROSS-REFERENCES TO RELATED APPLICATIONS

The present disclosure claims priority to U.S. Provisional Patent Application 63/090,646 filed Oct. 12, 2020, entitled "INSTANCE INSTRUMENTATION FOR DIFFERENT DATA SOURCES", which is incorporated herein by reference in its entirety.

TECHNICAL FIELD

The present disclosure relates to an interactive application security testing system, and more particularly to a system and method for the efficient handling, processing, and tracking of data that are received from different types of data sources.

BACKGROUND

Data input to a database or otherwise handled by a system may come from trusted sources (e.g., from source code, configuration files or queries from a database that an authorized user can update) or untrusted sources. Data that come from untrusted sources may be referred to as tainted data. Tainted data may refer to any data that originates from, or is influenced by, an external party. For example, consider a website displaying a blog post and a textbox for inserting a comment. The content of the blog post and the supporting markup language originate from the website itself, and thus are trusted sources for data. However, any user may input a comment into a textbox on the blog. Since the comment comes from an external (untrusted) source, the comment is considered to be tainted data. Moreover, any data that are further influenced by such tainted data (e.g., the comment) are also considered to be tainted data. For example, if the comment is converted to upper case characters, concatenated, converted to another form of data, or manipulated in any way, the resultant comment is considered to be tainted data.

Tainted data, if not handled properly (e.g., quarantined, sanitized, or the like) can inject malicious code or otherwise cause aberrant behavior in a system processing the tainted data or any downstream system processing results affected by the tainted data. Various systems use functions in association with external data input sources to mark the tainted data as such when the input is received. Various checks can be implemented on the inputs to ensure that the tainted status of the input is properly applied to the output of various functions performed on the tainted data, so that appropriate data-handling measures are taken downstream. These checks require computing resources to perform, thus consuming clock cycles and memory space for the check functions. The checks may be hard coded by a programmer, or may be instrumented at runtime, where the system automatically replaces an original function with a different function based on the original function, but including the check function to mark the output of the original function as tainted if the inputs include tainted data.

Interactive Application Security Testing (IAST) solutions (like the SEEKER® software package, available from Synopsys, Inc. of Mountain View, CA) use instrumentation technology (i.e., replacing parts of the program during execution of the program) to track the program execution and dataflow. Specifically, IAST solutions may use this technique to track tainted data—any information that is introduced to the program from an external source (e.g., retrieved from a web form or URL parameters) is marked as unsafe in the sense that a skilled attacker could use that input method to introduce a malicious payload that may cause harm to the application. These tainted (unsafe) data are tracked as the data are passed and manipulated throughout the program. For example, if a string is considered tainted, the result of this string's conversion to lowercase is also considered tainted. In such a case, it is said that the tainted data is propagated. If these unsafe (tainted) data reach a vulnerable method (called a sink) such as a file write or a Structured Query Language (SQL) execution, an IAST tool may conclude that a vulnerability is present in the application.

SUMMARY

In various embodiments, the present disclosure provides methods, systems (including a processor; and a memory including computer-readable instructions that when executed by the processor enable performance of an operation), and non-transitory computer readable media (including instructions that when executed by a processor perform an operation), comprising: identifying an instance of a function in a program that receives input from an untrusted source providing input data that are tainted; and replacing, at runtime of the program, the instance of the function with an instrumented version of the function that includes a marking function that indicates when an output of the instrumented version of the function is tainted by the input data received from the untrusted source.

In various embodiments, the present disclosure provides methods, systems (including a processor; and a memory including computer-readable instructions that when executed by the processor enable performance of an operation), and non-transitory computer readable media (including instructions that when executed by a processor perform an operation), comprising: identifying an instance of a function in a program that receives input data from a given source of a given type associated with a first classification of data; and replacing, at runtime of the program, the instance of the function with an instrumented version of the function that includes a marking function that indicates when an output of the instrumented version of the function carries data of the first classification affected by the input data received from the given source to thereafter also be classified according to the first classification.

In various embodiments, the present disclosure provides methods, systems (including a processor; and a memory including computer-readable instructions that when executed by the processor enable performance of an operation), and non-transitory computer readable media (including instructions that when executed by a processor perform an operation), comprising: identifying an instance of a function in a program that receives input from an untrusted source that provides input data that are tainted; and replacing, at runtime of the program, the instance of the function with an instrumented version of the function that includes a marking function that indicates when an output of the instrumented version of the function is tainted by the input received from the untrusted source.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2 illustrates JavaScript implementations for various functions referenced herein, according to embodiments of the present disclosure.

DETAILED DESCRIPTION

Figure 1A:
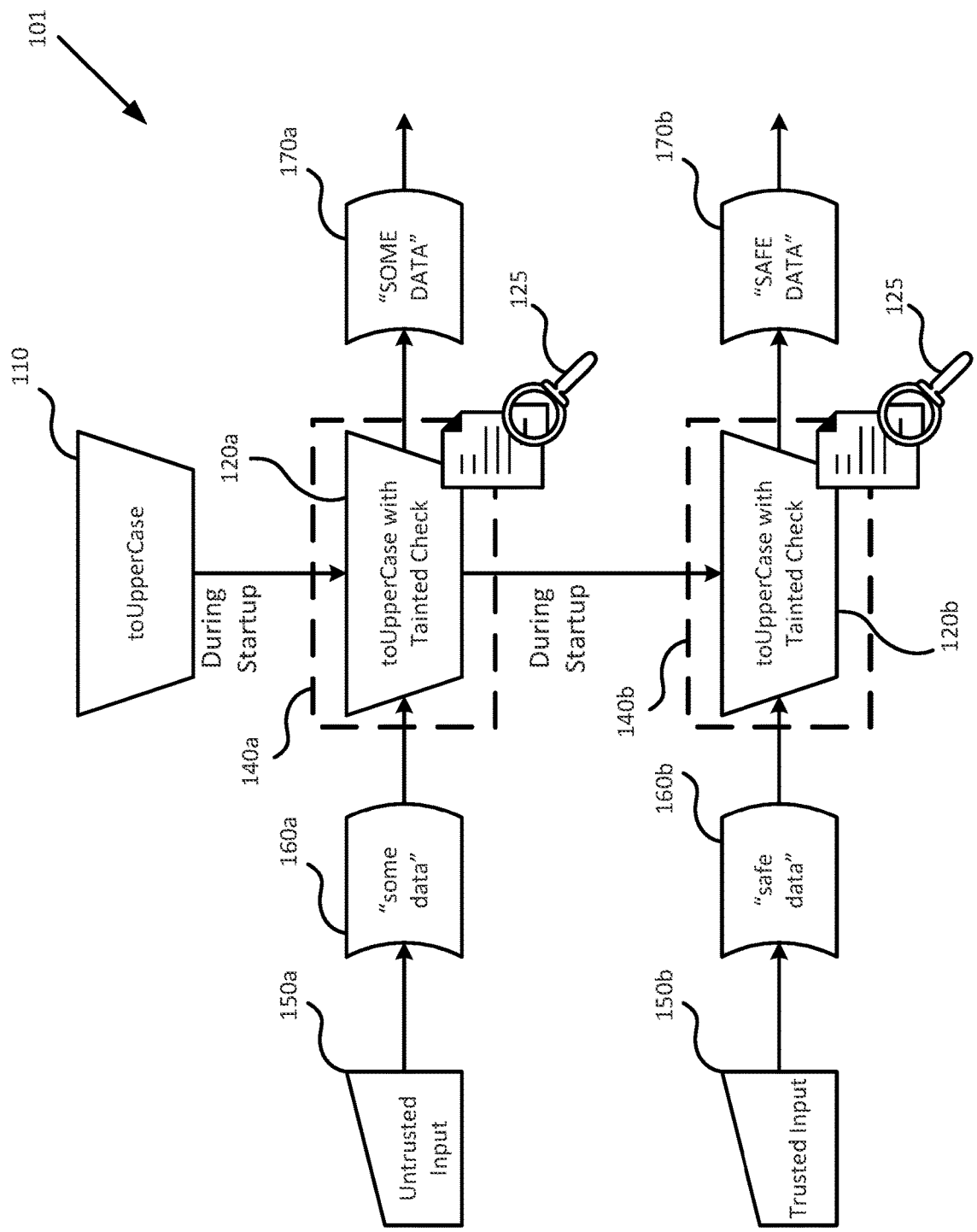
FIG. 1A illustrates total instrumentation implementation for a function, according to embodiments of the present disclosure.

Embodiments of the present disclosure relate to differentiating the detection and handling of tainted versus classifications of data to thereby improve the efficiency and functionality of an underlying computing device via instance instrumentation. As used herein, instrumentation or instrumenting refers to the ability to temporarily enhance or modify a system's code by changing various functions within the code without the involvement of the code's author (usually during runtime). Instrumentation provides various insights about the way the system functions, such as tracking tainted data through a code base or replace one version of a function with a different version with additional or enhanced functionalities.

Traditionally, Interactive Application Security Testing (IAST) solutions use instrumentation to modify the code of classes of function that may carry information and modify the methods of that code to check if the data were tainted, and if so, propagate that tainted information to the result. This approach poses a noticeable performance penalty on the application, as potentially every action that manipulates data needs to evaluate whether the data are tainted, although most of the data in an application are not tainted.

The present disclosure selectively employs instrumentation in selected instances of a method, rather than in all instances of the method (i.e., instanced instrumentation), to track the flow of tainted (and other classes of) data through the system with the purpose of detecting security flaws. Any scenario where tainted data are allowed to reach a potentially vulnerable function (such as executing a query against a database or opening a file) can potentially be a security flaw.

Although generally discussed herein as "tainted" or "untainted" data, the present disclosure can be applied to different classifications of data, which may be layered with several classifications. For example, the data may be classified as "confidential" or "non-confidential" data so that once confidential data are included within the data stream, an operator can prevent release of any affected data to any unauthorized user. Similarly, as data are collected and manipulated, untrusted users may "taint" the data to be unsafe to save to a database before sanitizing the data, which can thereafter result in "unsafe confidential data", "safe confidential data", "unsafe non-confidential data", and "safe non-confidential data". Additionally, various flavors of how the data are tainted may be tracked via different classifiers associated with different instrumentation effects in the program (e.g., tainted from untrusted end user vs. tainted from semi-trusted third party). Accordingly, instanced instrumentation may be used across a plurality of different classifications for data and associated marking functions, which can handle one or more different classifications schemes in parallel via different instrumentation implementations.

For example, consider a system where candidates can submit applications for a job opening. The system receives data from two sources: (1) the users who manually input data in a web page, and (2) a third party service that performs background checks on the candidates. The user data are considered as unsafe or "tainted", as an attacker could use the same form to attempt to inject a malicious payload to the application, and therefore these data should never reach a sink (e.g., be saved to a database) without first being sanitized. The third-party data may also be considered unsafe as a basic security principle. In other words, as a security policy, the system cannot assume a third party service is safe, and the system should further sanitize any data received from that third party before treating those data as "safe" or otherwise untainted. Moreover, any data retrieved from this third party are also considered confidential, which taints the data as these data should never be returned from the system to an end-user even once otherwise rendered safe for storage to a database.

Accordingly, in this example, the system can define rules for data classification tracking for operations that involve more than one output so that if at least one of the inputs is confidential, the result of the operation should also be treated as confidential and if at least one of the inputs is unsafe, the result of the operation should also be treated as unsafe. In various embodiments, the confidential/non-confidential status can be tracked separately from the unsafe/safe status, or as a single check for whether the data are tainted since the data from the third party are both unsafe and confidential. Stated differently, any confidential data may also be treated as unsafe without needing to perform a separate marking action.

When implementing these rules in a total instrumentation approach, a function with two arguments would perform four different classification status checks (e.g., is the first argument confidential?; is the first argument unsafe?; is the second argument confidential?; is the second argument unsafe?), even when the vast majority of data handled by the system are neither unsafe nor confidential; thus consuming unneeded computing resources and slowing overall performance of the program.

However, in the instanced instrumentation approach described in the present disclosure, some of the check operations can be omitted—calling a function to mark the output as tainted (e.g., unsafe, confidential. both) without performing one or more if/then or if/else operations (e.g., unconditionally calling a marking function).

Continuing the example, when the first argument is known to be confidential/unsafe (e.g., traceable to data from the third party), functions handling that input value can unconditionally mark an associated output as also being confidential and unsafe. Because the second argument does not alter the status of the output, and the confidential/unsafe value of the output is already known by the status of the first argument, the system may omit (e.g., perform zero) if/then or if/else operations in these instances of the function.

When the first argument is known to be unsafe (e.g., traceable to the end-user), the second argument does not alter the unsafe/safe status of the output, but may affect the confidential/non-confidential status. Accordingly, the system performs checks for confidentially in the second argument, thus requiring one if/then or if/else operation rather than four in these instances of the function.

When the first argument is known to be untainted (e.g., neither marked as unsafe nor as confidential), the second argument may affect the output of the function to be either confidential/unsafe or unsafe. Accordingly, the system performs checks for confidentially and safety on the second argument, thus requiring two if/then or if/else operation rather than four in these instances of the function.

In each of the above cases, the system can perform fewer status checks on potentially tainted data, and instead can unconditionally call marking functions, thus improving the speed at which a program can be executed, conserving computing resources, and saving power, among other benefits.

Figure 1B:
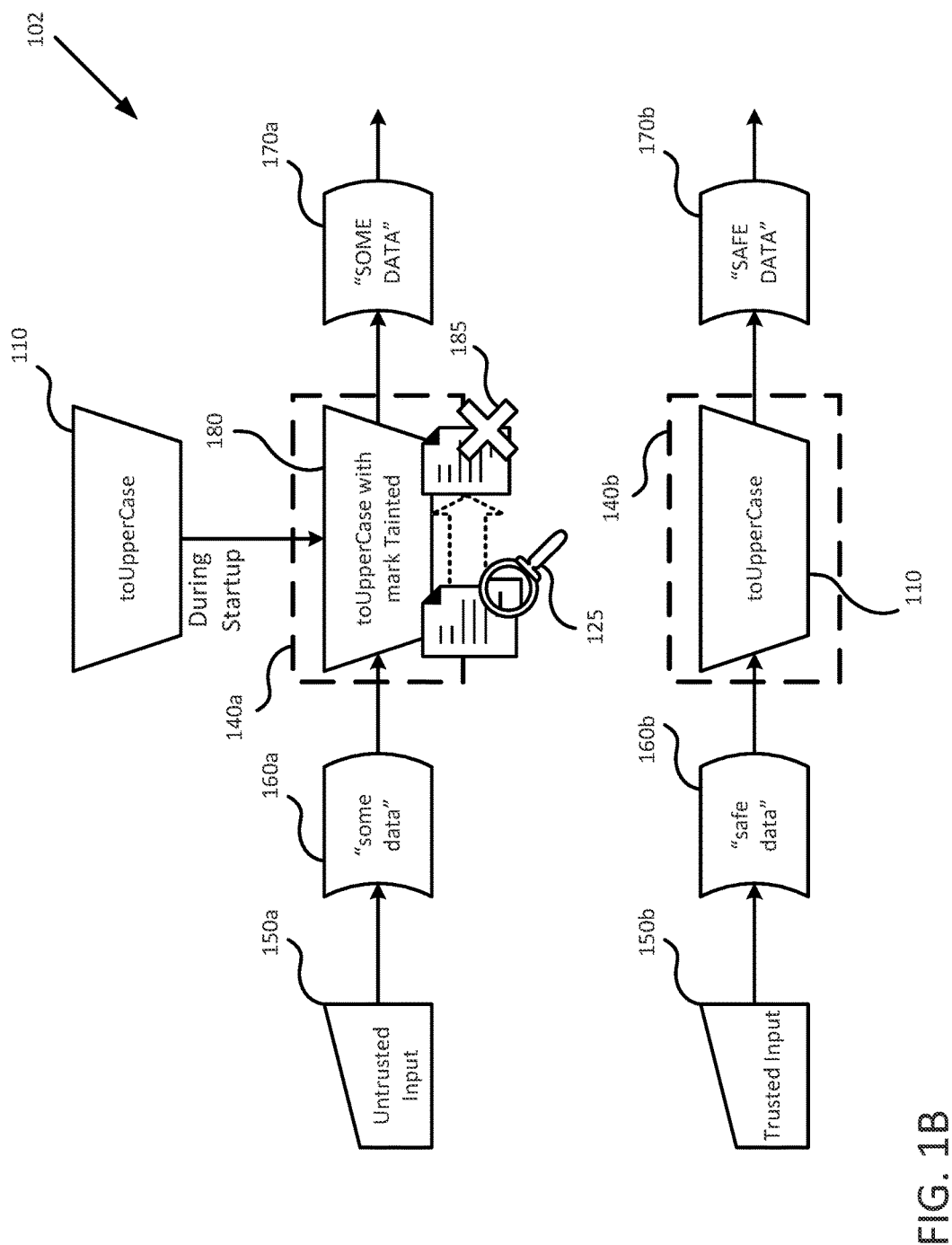
FIG. 1B illustrates instance instrumentation for the same function as described in FIG. 1A, according to embodiments of the present disclosure.

FIGS. 1A and 1B illustrate alternative instrumentation implementations, where FIG. 1A illustrates total instrumentation implementation 101 for a function while FIG. 1B illustrates instance instrumentation 102 for the same function, according to embodiments of the present disclosure. As used herein, total instrumentation replaces every instance of a given function with a different version thereof, while instance instrumentation replaces a select subset of the instances of a given function with a different version thereof.

Figure 4:
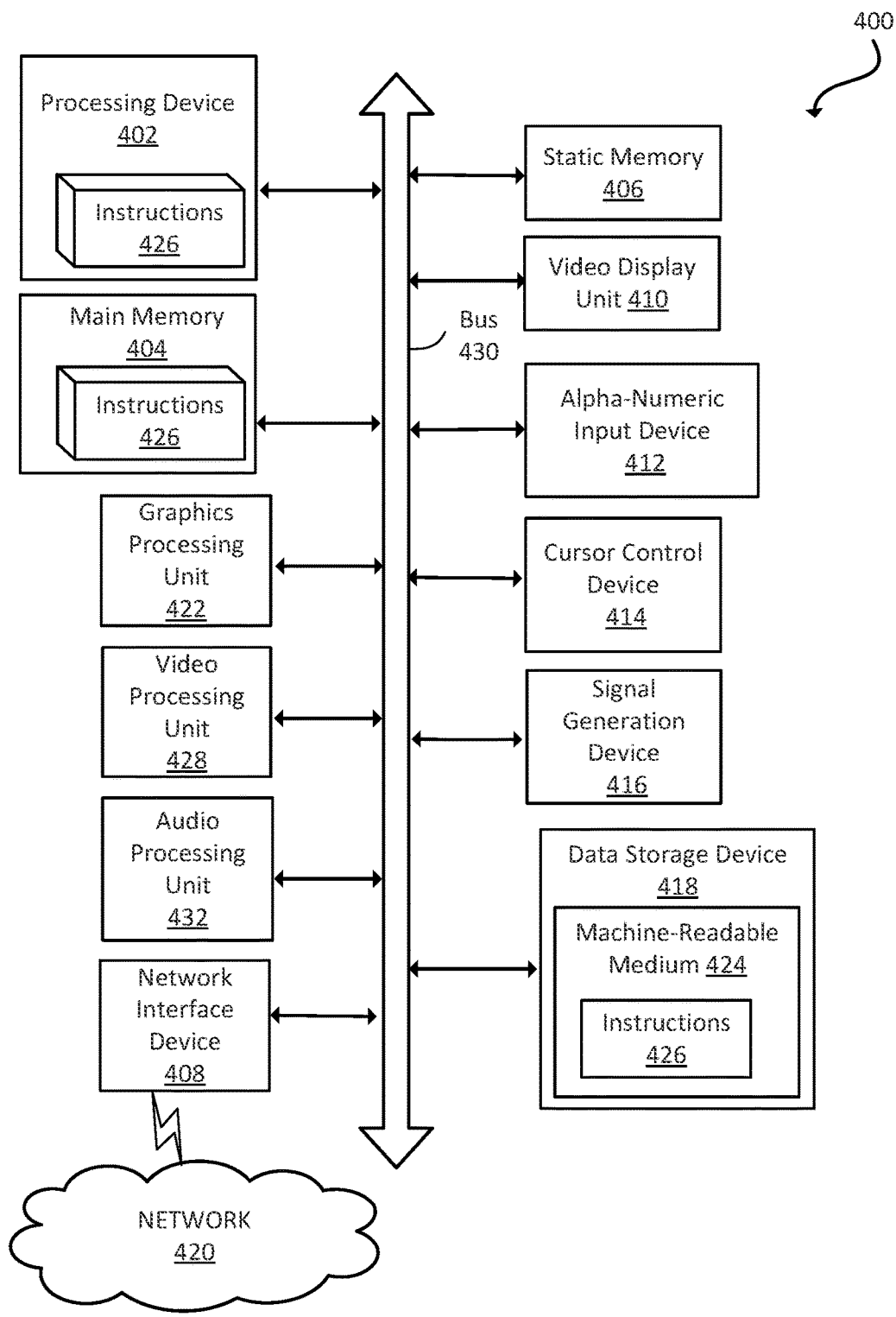
FIG. 4 illustrates an example machine of a computer system within which a set of instructions, for causing the machine to perform any one or more of the methodologies discussed herein, may be executed, according to embodiments of the present disclosure.

In FIG. 1A, a computing system, such as that described in greater detail in regard to FIG. 4, instruments a method of a class, prototype, or function (collectively referred to herein as a function) during start up to replace the initially selected function with a different (instrumented) function. Regardless of whether the instance of a function handles tainted data, the system replaces each call to that function with a different version that includes a check for the tainted condition. For example, instrumenting can replace an original version of a function for "toUpperCase" with an instrumented version of "toUpperCase" (e.g., "toUpperCaseCheck") that is called on strings that are tainted or untainted. The output string value for "toUpperCaseCheck" is the same regardless of whether the input is tainted to not. However, as is described in greater detail in regard to FIG. 2, "toUpperCaseCheck" includes a call to the "isTainted" to conditionally mark the output as tainted versus untainted whereas "toUpperCase" does not.

In the conventional total instrumentation method, the instrumented version is called on both tainted and untainted data; using a call to the "isTainted" function regardless of whether the call is needed or not. When significant portions of the data handled by the system are untainted (e.g., at least 50%), the repeated calls to "isTainted" result in noticeable performance overhead for unneeded calls to "isTainted" with no benefit to the user. The present disclosure therefore provides for instanced instrumentation, where some calls to "isTainted" are avoided, thus reducing the overhead to run the code.

For example, consider a system where 90% of the calls are on untainted data and the remaining 10% of the calls are on tainted data. For the 10% of the data that are tainted the additional overhead for calling "isTainted" provides a benefit for tracking tainted data in the code to find and guard against security vulnerabilities, while for the 90% data that are untainted, calls to "isTainted" use computing resources without providing a commensurate benefit. Accordingly, by using instance instrumentation in the example system, a user can reduce overhead by not calling "isTainted" 90% of the time, thus conserving computing resources or otherwise executing the code more efficiently.

In the total instrumentation implementation 101 shown in FIG. 1A using a base-instance function 110 (e.g., toUpperCase), the system replaces each instance of the base-instance function 110 with a check-tainted version thereof that includes a call to a status-checking function 125 (e.g., isTainted). For example, the system replaces a first instance 140a where the base-instance function 110 appeared with a first instance of a checking-instance function 120a (e.g., toUpperCaseCheck) that checks for a tainted status in an associated first input 160a before applying the tainted status to a first output 170a. Similarly, the system replaces a second instance 140b where the base-instance function 110 appears with a second instance of the checking-instance function 120b that checks for a tainted status in an associated second input 160b before applying the tainted status to a second output 170b. The replacement of the base-instance function 110 in the total instrumentation implementation 101 is performed globally, regardless of whether the given instance 140a, 140b receives input from an untrusted input 150a or a trusted input 150b respectively. When significant portions of the data handled by the system are untainted (e.g., at least 50%), the repeated calls to the status-checking function 125 result in noticeable performance overhead.

In FIG. 1B, the system does not instrument every occurrence of a function during start up, but rather instruments only those instances that handle tainted data, thus reducing extraneous calls to a status-checking function 125 such as "isTainted". As will be appreciated, although provided with reference to "isTainted", instrumentation can include additional function calls in an instrumented version of the function that are not present in the original version of the function during start up that are not needed when handling untainted data. Instead, the system marks occurrences of the function during start up as tainted (and therefore to be replaced with the instrumented version during runtime) when the input is received from an untrusted source or the input is received from another instrumented function and is therefore handling tainted data. The occurrences of the function that handle untainted data are considered safe, and thus use the original version of the function. Subsequently, during runtime of the system, the system receives user input that may include tainted data and safe data and applies the instrumented function to the tainted data, and applies the base-instance function 110 to the safe data. Similarly, when handling different classifiers than tainted/untainted, the system can differentiate between the different classifications and apply the corresponding instrumented function for the other classifiers (e.g., confidential/non-confidential, tainted-third party/tainted unknown party).

Using a base-instance function 110, the system replaces instances of the base-instance function 110 with a mark-tainted version thereof, or leaves the base-instance function 110 alone based on the input source for the given instance. For example, the system replaces a first instance 140a where a base-instance function 110 appears with a marking-instance function 180 (e.g., toUpperCaseMark) that unconditionally (i.e., always, without checking input source type or status) marks an associated first output 170a with a tainted status when the first input 160a is received from an untrusted input 150a by calling a marking function 185 (e.g., markTainted) without calling a status-checking function 125. The system, however, does not change a second instance 140b where the base-instance function 110 appears when the second input 160b is received from a trusted input 150b, thus providing a second output 170b that is also unmarked.

In various embodiments, a sanitizer function can be called to remove any tainted data to restore an "untainted" status to data further downstream. For example, when a function receives a tainted string of "ABC" from a concatenation function that received trusted data of "A" and "C", but untrusted data of "B", a sanitizer function may delete or otherwise remove the untrusted data to produce an output of "AC", "A*C", "A C" or the like that does not include the tainted data of "B". In a total-instrumentation solution, every call to such a sanitizer function will have an additional cost of attempting to remove the tainting information, regardless of whether the original data was tainted or not. However, in the instance-instrumentation solutions described herein, the sanitizer function could be added only to those functions tracked as handling tainted data, thus conserving computing resources.

FIG. 2 illustrates JavaScript implementations for the status-checking function 125 (e.g., isTainted), marking function 185 (e.g., markTainted), the base-instance function 110 (as a toUpperCase function), the marking-instance function 180 (as toUpperCaseMark), and the checking-instance function 120 (as toUpperCaseCheck), according to embodiments of the present disclosure. The examples illustrated in FIG. 2 are provided in a format consistent with the JavaScript programming language for ease of understanding, but the present disclosure may be applied via various programming languages current, past, or future.

The status-checking function 125 returns a status of a provided input as one of tainted or untainted. The various data are marked as tainted or untainted via the marking function 185. Although not illustrated, an unmarking function (e.g., markUntainted) may be provided to note the status of data that is by default marked as tainted as untainted, or to remove the tainted status from data assessed or manipulated by a sanitization function. Although shown as providing a bi-modal status (e.g., either a first option or a second option), in various embodiments, various multi-modal statuses with multi-variate states (e.g., low, medium, or high risk; red, green, or blue) or multiple different states (e.g., age of data and security risk of data) can be marked by and tracked by various functions by various versions of the status-checking function 125 and the marking function 185.

In one embodiment, each of the base-instance function 110, the checking-instance function 120, and the marking-instance function 180 illustrated in FIG. 2 convert lowercase letters to uppercase letters in an input string or other character-based variable (e.g., "lowercase" to "LOWERCASE", "John-Doe-17" to "JOHN-DOE-17"). The base-instance function 110 is the basis for the checking-instance function 120 and the marking-instance function 180, but the checking-instance function 120 and the marking-instance function 180 handle tainted data differently.

The checking-instance function 120 does not know whether the data passed to the checking-instance function 120 as an input is tainted or untainted, and therefore calls the status-checking function 125 to determine the status of the input as tainted or untainted. Based on the output of the status-checking function 125, the checking-instance function 120 conditionally calls the marking function 185 to mark its output as tainted (if the input is tainted) or leave the output marked as untainted (by not calling the marking function 185).

The marking-instance function 180 unconditionally calls the marking function 185 to indicate that its output is also tainted, whereas the base-instance function 110 does not, thereby leaving its output unmarked (or remaining marked as untainted). When instrumented according to the implementation shown in FIG. 1B, neither the base-instance function 110 nor the marking-instance function 180 call the isTainted function 125, as the system knows that the status of the data handled by individual instances of the function (e.g., the original or instrumented versions).

As will be appreciated, although the example functions illustrated in FIG. 2 reference to a base-instance function 110 of "toUpperCase" and instrumented versions of the toUpperCase function, other functions are contemplated by the present disclosure. Examples of other functions, which are applied to one string to produce another string include, but are not limited to: big, blink, bold, fixed, italics, small, strike, sub, sup, toLocaleLowerCase, toLowerCase, toLocaleUpperCase, toUpperCase, concat, fontcolor, fontsize, link, padEnd, padStart, repeat, replace, replaceAll, anchor, substring, substr, trimRight, trimLeft, trimStart, trimEnd. The system can therefore instrument several different functions with instrumented versions of those functions that affect input data in various ways to produce associated outputs.

The monitored inputs can include strings and other inputs which may be individual or mutually tainted. For example, an untrusted user can provide a string to a "repeat" function and an argument for how many times to repeat the string, and one or both of the inputs may include untrusted data, which results in the output of the "repeat" function being treated as tainted.

By retaining use of the base-instance function 110 in cases where the marking function 185 is not needed, instead of naively replacing all instances of the base-instance function 110 with the checking-instance function 120, the system is able to process both the tainted data and the untainted data faster. However, by replacing the base-instance function 110 with the marking-instance function 180 (which includes the marking function 185) for data received from input sources that are tainted, the system is able to properly handle the inputs received from untrusted sources and any downstream data affected by the tainted data. As used herein, upstream and downstream are relative terms in the flow of code execution, where upstream data are more proximal in a data handling chain to a data source relative to data indicated as downstream thereto.

Additionally, by using instanced instrumentation as described herein, neither the base-instance function 110 nor the marking-instance function 180 call a status-checking function 125 (e.g., an isTainted function) to determine the status of the data as tainted or untainted. Because the system instruments the base-instance function 110 with the marking-instance function 180 only for tainted data, and leaves instances of the base-instance function 110 un-instrumented when handling untainted data, there is no need to check for tainted status in either function. Stated differently, instanced instrumentation includes a check for tainted versus untainted status when determining whether to instrument a function, thus rendering a separate check function for the status in the function redundant.

Figure 3:
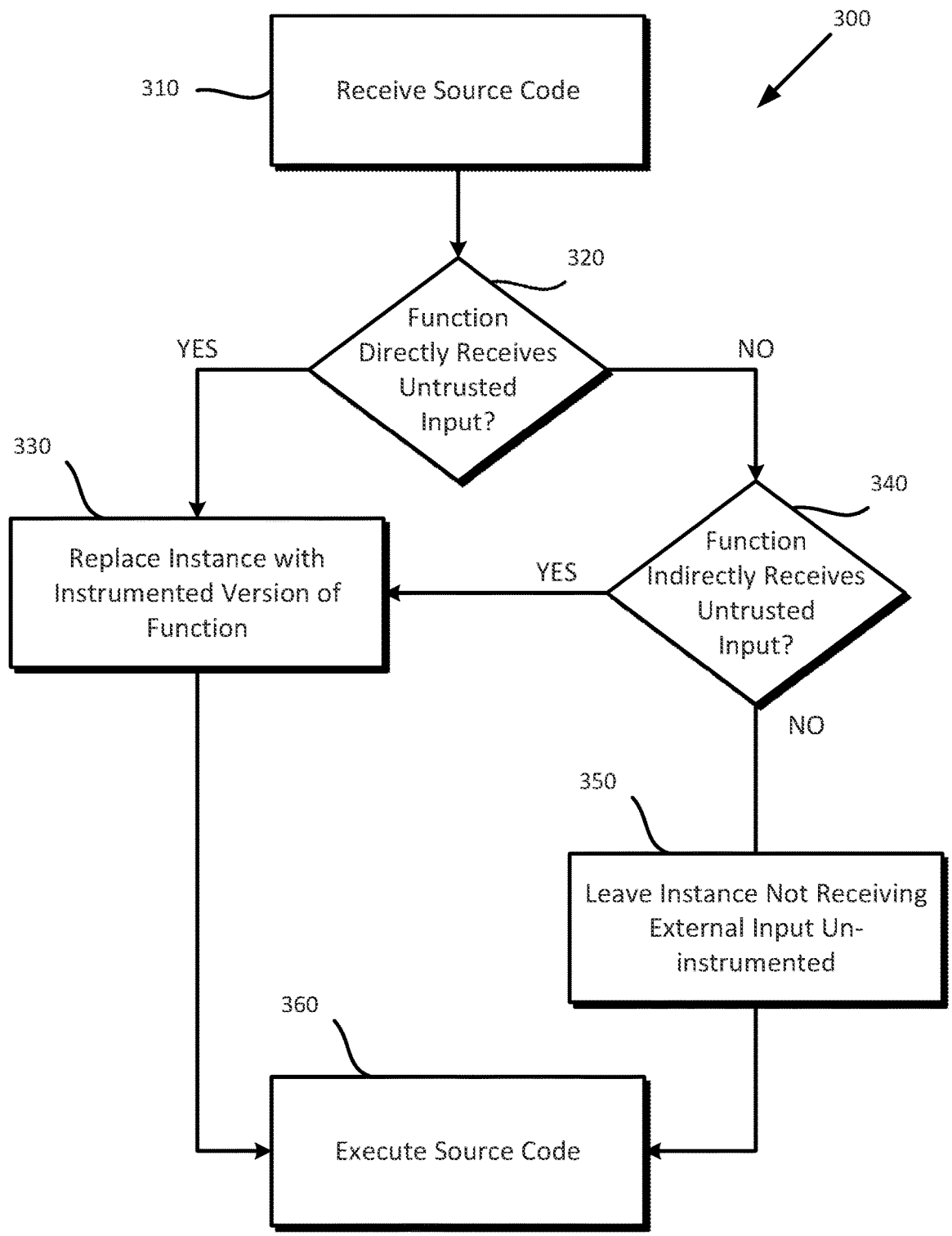
FIG. 3 is a flowchart of a method for providing instanced instrumentation, according to embodiments of the present disclosure.

FIG. 3 is a flowchart of a method 300 for providing instanced instrumentation, according to embodiments of the present disclosure. Method 300 begins at 310, where the system (such as the computer system 400 described in greater detail in regard to FIG. 4) receives code for execution.

At 320, at runtime of the code, the system identifies instances of functions in the code that directly receive inputs from untrusted (e.g., external) sources. For instances of functions that receive inputs from untrusted sources, method 300 proceeds to 330. For instances of functions that do not directly receive inputs from untrusted sources, method 300 proceeds to 340.

At 330, the system replaces the instances of the functions that receive inputs from an untrusted source with instrumented versions of those functions. The instrumented versions include a call to a marking function 185 (e.g., the markTainted function) that marks the output of the instrumented version of the function as being affected by the input received from the untrusted source (e.g., as "tainted"). The marking function 185 is directly and unconditionally called by the instrumented version of the function, without calling a status-checking function 125.

At 340, the system identifies whether the instances of the functions that do not directly receive inputs from untrusted source receive inputs indirectly from an untrusted source. For example, if the output of a first instance of a first function that receives input from an external source is received as an input for a second instance of a second function, the second instance of the second function indirectly receives input from the external source via the first instance of the first function. In some embodiments, a sanitization function included in the code that modifies or certifies the tainted data as safe and removes the tainted status from the data is included in the flow between the first instance and the second instance, to thereby provide an output that is treated as a trusted source. Accordingly, if a sanitization function were inserted between the first instance and the second instance in the above example, the second instance is identified as not receiving an input affected by an untrusted source, and therefore is treated as receiving inputs from trusted sources.

For instances of functions that indirectly receive inputs from untrusted sources, method 300 proceeds to 330. For instances of functions that do not receive inputs from untrusted sources, method 300 proceeds to 350.

At 350, the system leaves the instances that neither directly nor indirectly receive inputs from untrusted sources un-instrumented, so that the base-instance function 110 (e.g., the original version of the function specified in the code) remains in the runtime version of the code. Stated differently, instances of functions that are not affected by inputs from untrusted sources are not replaced with instrumented versions of those functions and are therefore left alone during setup.

Method 300 proceeds to 360 once a determination has been made for whether to replace or leave alone each instance of the functions in the source code. At 360, the system executes the code as instrumented.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 may be configured to execute instructions 426 for performing the operations and steps described herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a non-transitory computer-readable medium) on which is stored one or more sets of instructions 426 or software embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In some implementations, the instructions 426 include instructions to implement functionality corresponding to the present disclosure. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

THE CLAIMS

What is claimed is:

1. A method, comprising:
    identifying a first instance of a function in a program that receives tainted input data from an untrusted source, the first instance of the function being a subset of all instances of the function; and
    replacing, during runtime of the program, the first instance of the function receiving the tainted input data, being the subset of all the instances of the function, with an instrumented version of the function that calls a marking function that indicates an output of the instrumented version of the function includes the tainted input data received from the untrusted source.

2. The method of claim 1, further comprising:
    identifying a second instance of the function in the program that only receives trusted input data from trusted sources; and
    maintaining, during runtime of the program, the second instance of the function as an un-instrumented version of the function without marking the trusted input data.

3. The method of claim 1, further comprising:
    identifying a downstream instance of a second function in the program that only receives inputs from trusted sources and does receive input from the instrumented version of the function; and
    replacing, at runtime of the program, the downstream instance of the second function with a second instrumented version of the second function that includes the marking function to indicate a second output of the downstream instance of the second function was affected by the tainted input data received from the untrusted source.

4. The method of claim 1, wherein a status checking function is prevented from being called when the first instance of the function receiving the tainted input data is selectively replaced with the instrumented version of the function.

5. The method of claim 1, wherein a plurality of instances of the function are identified and replaced with the instrumented version of the function.

6. The method of claim 1, further comprising:
    identifying an instance of a second function in the program that receives input from a second untrusted source; and
    replacing, at runtime of the program, the instance of the second function with an instrumented version of the second function that includes the marking function to indicate an output of the instrumented version of the second function is tainted by the input received from the second untrusted source.

7. The method of claim 1, further comprising:
    identifying an instance of a second function in the program that receives input from a given source providing input data that are confidential; and
    replacing, at runtime of the program, the instance of the second function with an instrumented version of the second function that includes a second marking function that indicates when an output of the instrumented version of the second function is affected by the input data received from the given source to thereafter also be confidential.

8. A non-transitory computer readable medium including instructions that when executed by a processor perform an operation, comprising:
- identifying a first instance of a function in a program that receives tainted input data from a given source of a given type associated with a first classification of data, the first instance of the function being a subset of all instances of the function; and
- replacing, during runtime of the program, the first instance of the function receiving the tainted input data, being the subset of all the instances of the function, with an instrumented version of the function that calls a marking function that indicates an output of the instrumented version of the function carries data of the first classification affected by the tainted input data received from the given source to thereafter also be classified according to the first classification.

9. The non-transitory computer readable medium of claim 8, wherein the operation further comprises:
- identifying a second instance of the function in the program that does not receive input from the given source; and
- leaving, at runtime of the program, the second instance of the function alone, wherein the second instance of the function is not replaced with the instrumented version of the function.

10. The non-transitory computer readable medium of claim 8, the operation further comprises:
- identifying a downstream instance of a second function in the program that does not receive input from the given source and does receive input from the instrumented version of the function; and
- replacing, at runtime of the program, the downstream instance of the second function with a second instrumented version of the second function that includes the marking function to indicate a second output of the downstream instance of the second function was affected by the tainted input data received from the given source.

11. The non-transitory computer readable medium of claim 8, wherein a status checking function is prevented from being called when the first instance of the function receiving the tainted input data is selectively replaced with the instrumented version of the function.

12. The non-transitory computer readable medium of claim 8, wherein the operation further comprises:
- identifying an instance of a second function in the program that receives second input data from a second source of the given type; and
- replacing, at runtime of the program, the instance of the second function with an instrumented version of the second function that includes the marking function to indicate an output of the instrumented version of the second function carries data of the first classification as being affected by the second input data received from the second source to thereafter also be classified according to the first classification.

13. The non-transitory computer readable medium of claim 8, further comprising:
- identifying an instance of a second function in the program that receives input from a second source of a second type associated with a second classification of data unrelated to the first classification; and
- replacing, at runtime of the program, the instance of the second function with an instrumented version of the second function that includes a second marking function to indicate an output of the instrumented version of the second function is affected by the input received from an untrusted source to thereafter also be classified according to the second classification.

14. The non-transitory computer readable medium of claim 13, wherein an instance of a third function receives input from the instance of the function and the instance of the second function, the operation further comprising:
- replacing, at runtime of the program, the instance of the third function with an instrumented version of the third function that includes the marking function and the second marking function to indicate an output of the instrumented version of the third function is affected by inputs received from the given source and the second source to thereafter also be classified according to the first classification and the second classification.

15. A system, comprising:
- a processor; and
- a memory including computer-readable instructions that when executed by the processor enable performance of an operation comprising:
  - identifying a first instance of a function in a program that receives tainted input data from an untrusted source, the first instance of the function being a subset of all instances of the function; and
  - replacing, during runtime of the program, the first instance of the function receiving the tainted input data, being the subset of all the instances of the function, with an instrumented version of the function that calls a marking function that indicates an output of the instrumented version of the function includes the tainted input data received from the untrusted source.

16. The system of claim 15, the operation further comprising:
- identifying a second instance of the function in the program that does not receive input from the untrusted source; and
- leaving, at runtime of the program, the second instance of the function alone, wherein the second instance of the function is not replaced with the instrumented version of the function.

17. The system of claim 15, the operation further comprising:
- identifying a downstream instance of a second function in the program that does not receive input from the untrusted source and does receive input from the instrumented version of the function; and
- replacing, at runtime of the program, the downstream instance of the second function with a second instrumented version of the second function that includes the marking function to indicate a second output of the downstream instance of the second function was affected by the input received from the untrusted source.

18. The system of claim 15, wherein a status checking function is prevented from being called when the first instance of the function receiving the tainted input data is selectively replaced with the instrumented version of the function.

19. The system of claim 15, the operation further comprising:
- identifying an instance of a second function in the program that receives input from a second untrusted source; and
- replacing, at runtime of the program, the instance of the second function with an instrumented version of the second function that includes the marking function to indicate an output of the instrumented version of the second function is tainted by the input received from the second untrusted source.

20. The system of claim 15, wherein the marking function indicates one of more of a bi-modal status and a multi-modal status for data processed by the function.

* * * * *